United States Patent
Hatano

[11] Patent Number: 5,880,057
[45] Date of Patent: *Mar. 9, 1999

[54] CATALYST FOR EXHAUST GAS TREATMENT AND METHOD OF PREPARING THE SAME

[75] Inventor: Masaharu Hatano, Yokohama, Japan

[73] Assignee: Next Generation Catalyst Research Institute, Co. Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 652,815

[22] Filed: May 23, 1996

[30] Foreign Application Priority Data

Dec. 13, 1995 [JP] Japan .................................. 7-324667

[51] Int. Cl.$^6$ .............................. B01J 21/04; B01J 27/85
[52] U.S. Cl. .......................... 502/202; 502/207; 502/208; 502/213; 502/327; 502/334; 502/341
[58] Field of Search .................................. 502/208, 341, 502/327, 332, 355, 300, 305, 306, 351, 349

[56] References Cited

U.S. PATENT DOCUMENTS

| | | | |
|---|---|---|---|
| 3,448,164 | 6/1969 | Holm et al. | 260/683.2 |
| 4,018,706 | 4/1977 | Inoue et al. | 252/430 |
| 4,444,963 | 4/1984 | McDaniel et al. | 526/100 |
| 4,874,590 | 10/1989 | Staniulis et al. | 423/239 |

*Primary Examiner*—Bekir L. Yildirim
*Attorney, Agent, or Firm*—Gifford, Krass, Groh, Sprinkle, Anderson & Citkowski, P.C.

[57] ABSTRACT

The disclosed is an exhaust gas treatment catalyst and method therefor, which catalyst comprises a support material selected from the group consisting of elements of Group IIa, Group IIIa, Group IIIb, transition elements and rare earth elements and phosphorus, and an active metal supported on the surface of the support material, improved in high activity and high durability.

4 Claims, 4 Drawing Sheets

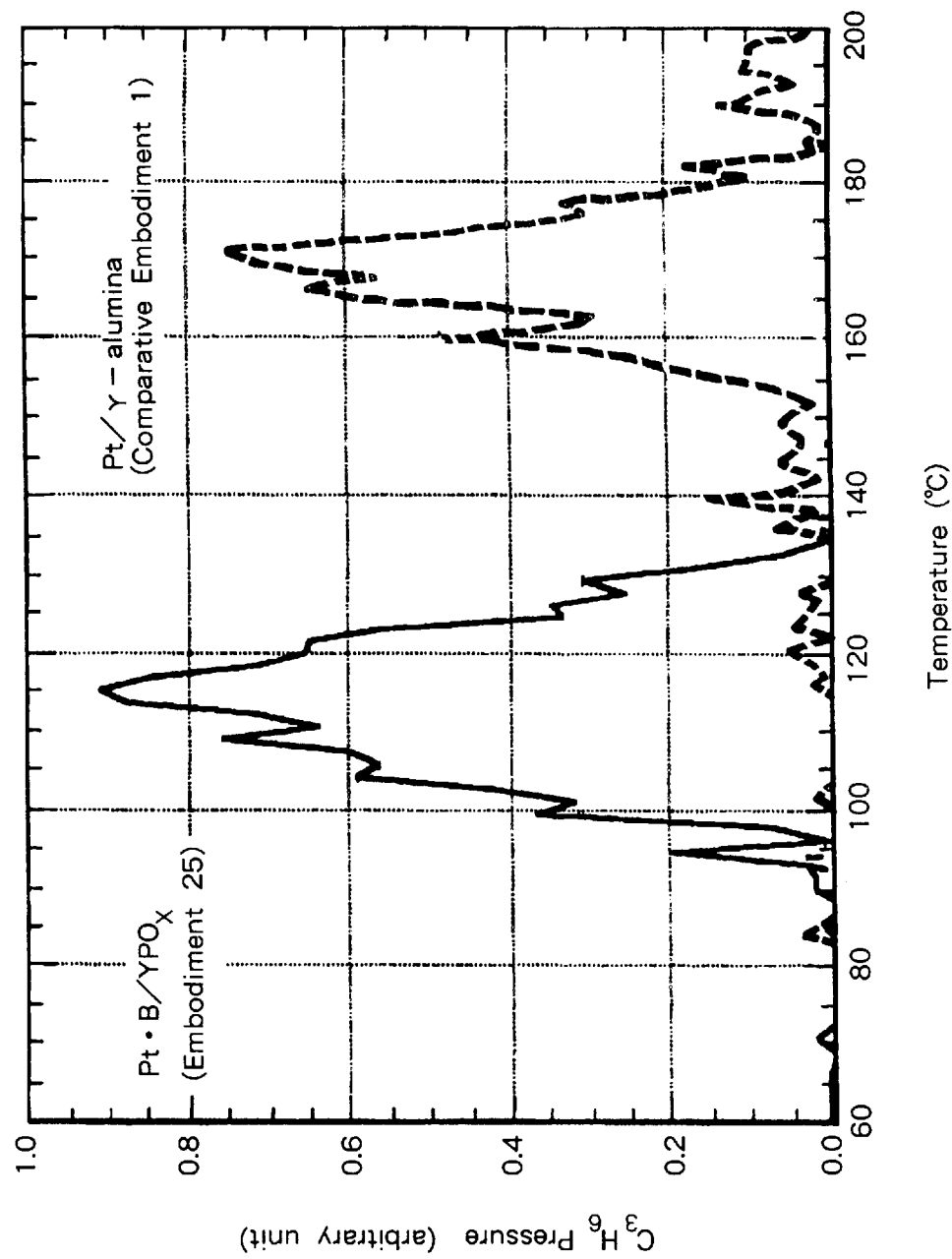

CATALYST FOR EXHAUST GAS TREATMENT AND METHOD OF PREPARING THE SAME

BACKGROUND OF THE INVENTION

1. Field of the Invention

The present invention relates to exhaust gas treatment catalysts improved in heat resistance and performance at low temperatures, and also having excellent conversion activity for nitrogen oxides, hydrocarbons, and carbon monoxide.

2. Brief Description of the Prior Art

The conventional exhaust gas treatment catalyst was normally comprising a gamma-alumina support and an active metal supported thereon.

In the case of the conventionally used gamma-alumina support, a high temperature and/or the presence of water vapor will cause sintering of the compound, reduction of the surface area, and lowered activity. Further, the gamma-alumina support suffers from toxicity of sulfur or phosphorus, the pores are clogged, the surface area is reduced, activity is lowered.

In the case of a conventional catalyst synthesized by a gamma-alumina support and an active metal supported thereon, since the activity is extremely reduced at temperatures lower than 300° C., the catalyst merely operates at the condition in which the exhaust gas is sufficiently warmed.

SUMMARY OF THE INVENTION

The present invention was made in order to overcome the disadvantages of the conventional problems, and an object of the invention is to provide an improved exhaust gas treatment catalyst, by employing a catalyst support material of a phosphate-containing compound oxide which exhibits improved heat resistance and anti-toxic properties in the condition of practical use.

Further, another object of the invention is to provide an improved catalyst in which the active metal is qualified by boron for sufficiently dispersing the active metal to the higher level and for releasing the self-poisoning caused by hydrocarbon or the like to sufficiently enhance the low temperature activity.

The catalyst of the invention comprises a support material including at least an element and a phosphate-containing compound oxide, wherein the element is selected from the group consisting of elements of Group IIa, Group IIIa, Group IIIb, transition elements and rare earth elements; and an active metal supported on the surface of the support material.

In preparing the catalyst, for the purpose of supporting the active metal on the surface of the support material, the support material is prepared through co-precipitation from a solution containing at least one salt of an element selected from the elements including those of Group IIa, Group IIIb, transition elements and rare earth elements, and phosphoric acid.

An object of the present invention is to provide, as the catalyst of the invention includes an active metal which is supported on the phosphate support material improved in higher heat resistance and anti-toxic property, higher activity and durability than have been realized before.

Another object of the present invention is to provide an exhaust gas treatment catalyst including boron.

In preparing the catalyst, for the purpose of supporting the active metal on the surface of the support material, the catalyst is prepared by immersing the support material in a solution containing a precursor of an active metal together with boric acid.

In the case that the active metal is modified by boron, the dispersion of the active metal on the surface of the support having the active metal supported thereon is extremely increased, thereby a higher catalytic activity than have seen before is achieved.

Strong adsorption of hydrocarbons in the low temperature range is suspended, and adsorption hindrance by the molecules is prevented, thereby the removal of for NO, hydrocarbons and CO is extremely enhanced.

As discussed above, the catalysts of the invention can be operative also at low temperatures, and thereby deactivation of catalytic ability by agglomeration of the metal is effectively prevented, and the activity can be maintained for a long period of time.

BRIEF DESCRIPTION OF THE DRAWINGS

FIG. 4 is the result of $C_3H_6$ temperature-programmed desorption (TPD) test of Embodiment 25 and Comparative Example 1, wherein the vertical coordinate is represented by an arbitrary unit (a.u.).

DETAILED DESCRIPTION OF THE PREFERRED EMBODIMENTS

Figure 1:
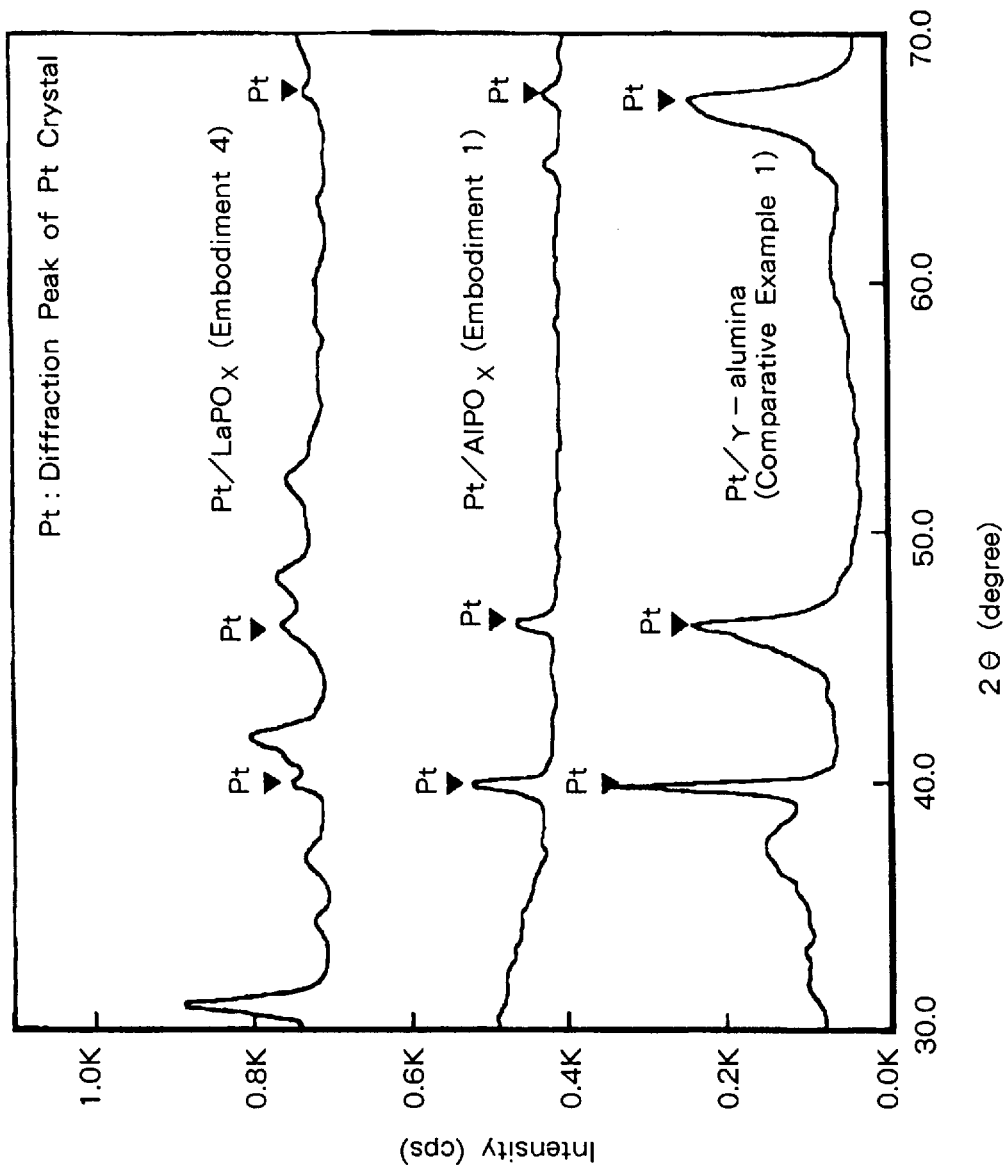
FIG. 1 is the X-ray Diffraction (XRD) patterns of catalysts according to Embodiments 1 and 4, as well as Comparative Example 1.

[1] The Embodiments 1 to 11 relate to phosphate-containing compound oxide supported platinum catalysts, that is, exhaust gas treatment catalysts, each comprising a phosphate-containing compound oxide as the support material and platinum which is supported on the surface of the support material, and also relate to the method of preparing such platinum catalysts.

Embodiment 1

An aqueous solution of aluminum nitrate and phosphoric acid was prepared so that the ratio of aluminum relative to phosphorus is 1:1, and, into the solution, aqueous ammonia was added at the rate of 0.4 ml/min with stirring. The aqueous ammonia was further reduced with measurement of the pH value of the solution, and addition of the solution was terminated at the pH value was reached at 7.0. The resulting solution containing a co-precipitate of aluminum and phosphorus was allowed to be kept quiet for 17 hours at room temperature, and then filtered by aspiration to produce a gel-formed co-precipitate.

The gel-formed co-precipitate was washed with 400 ml of purified water, then dried at 110° C. for 40 hours and milled using a mortar to produce fine powder. The powder was calcined at 400° C. for 3 hours to synthesize aluminum-phosphorus compound oxide support.

The prepared oxide support was immersed in aqueous solution of tetrammine platinum nitrate, whose concentration was adjusted so as to contain 2 wt % of platinum relative to the support material. After the water was evaporated, the residue was dried and calcined at 600° C. for 5 hours to synthesize a platinum catalyst supported on aluminum-phosphorus compound oxide.

Embodiment 2

A platinum catalyst supported on boron-phosphorus compound oxide was prepared, in exactly the same process as in Embodiment 1, but replacing aluminum nitrate with boric acid.

Embodiment 3

A platinum catalyst supported on gallium-phosphorus compound oxide was prepared, in exactly the same process as in Embodiment 1, but replacing aluminum nitrate with gallium nitrate.

Embodiment 4

A platinum catalyst supported on lanthanum-phosphorus compound oxide was prepared, in exactly the same process as in Embodiment 1, but replacing aluminum nitrate with lanthanum nitrate.

Embodiment 5

A platinum catalyst supported on cerium-phosphorus compound oxide was prepared, in exactly the same process as in Embodiment 1, but replacing aluminum nitrate with cerium nitrate.

Embodiment 6

A platinum catalyst supported on yttrium-phosphorus compound oxide was prepared, in exactly the same process as in Embodiment 1, but replacing aluminum nitrate with yttrium nitrate.

Embodiment 7

A platinum catalyst supported on magnesium-phosphorus compound oxide was prepared, in exactly the same process as in Embodiment 1, but replacing aluminum nitrate with magnesium nitrate.

Embodiment 8

A platinum catalyst supported on calcium-phosphorus compound oxide was prepared, in exactly the same process as in Embodiment 1, but replacing aluminum nitrate with calcium nitrate.

Embodiment 9

A platinum catalyst supported on manganese-phosphorus compound oxide was prepared, in exactly the same process as in Embodiment 1, but replacing aluminum nitrate with manganese nitrate.

Embodiment 10

A platinum catalyst supported on cobalt-phosphorus compound oxide was prepared, in exactly the same process as in Embodiment 1, but replacing aluminum nitrate with cobalt nitrate.

Embodiment 11

A platinum catalyst supported on nickel-phosphorus compound oxide was prepared, in exactly the same process as in Embodiment 1, but replacing aluminum nitrate with nickel nitrate.

Comparative Example 1

A platinum catalyst in the structure including an active metal supported on gamma-alumina support was prepared in the conventional method in the following process: the gamma-alumina was immersed in aqueous solution of tetrammine platinum nitrate, whose concentration was adjusted so as to contain 2 wt % of platinum relative to the support material. After the water was evaporated, the residue was dried and calcined at 600° C. for 5 hours to synthesize a platinum catalyst supported on the surface of gamma-alumina support material.

Performance Test

Each of platinum catalysts supported on phosphate-containing compound oxide was tested by a conventional fixed-bed flow system under atmospheric pressure.

The reaction gas comprised: NO: 1000 ppm, $C_3H_6$: 1000 ppm, CO: 1200 ppm, $H_2$: 400 ppm, $O_2$: 6%, $CO_2$: 10%, $H_2O$: 10%, $N_2$: Bal. The gas was supplied to 0.4 grams of the catalyst with a flow rate of 2.5 liter/min., wherein the space velocity was 200,000 to 400,000 $h^{-1}$. Under the flow of the reaction gas, the catalyst was subjected to heat treatment at 873K, and thereafter the performance was evaluated at reaction temperatures not exceeding 648K. For all of the catalysts above, the maximum conversion rate for $C_3H_6$ and CO was as high as 99% or more. Table 1 shows the maximum conversion rate for NO and reaction temperatures corresponding to the maximum conversion rate.

TABLE 1

| Name | Catalyst | Maximum Conversion % for NO | Maximum Activity Temperature °K. |
| --- | --- | --- | --- |
| Embodiment 1 | Pt/AlPO$_x$ | 27.7 | 600 |
| Embodiment 2 | Pt/BPO$_x$ | 26.5 | 600 |
| Embodiment 3 | Pt/GaPO$_x$ | 27.2 | 600 |
| Embodiment 4 | Pt/LaPO$_x$ | 26.9 | 568 |
| Embodiment 5 | Pt/CePO$_x$ | 22.8 | 570 |
| Embodiment 6 | Pt/YPO$_x$ | 21.8 | 580 |
| Embodiment 7 | Pt/MgPO$_x$ | 26.0 | 577 |
| Embodiment 8 | Pt/CaPO$_x$ | 25.2 | 589 |
| Embodiment 9 | Pt/MnPO$_x$ | 20.9 | 595 |
| Embodiment 10 | Pt/CoPO$_x$ | 20.8 | 572 |
| Embodiment 11 | Pt/NiPO$_x$ | 22.8 | 582 |
| Comparative Example 1 | Pt/gamma-alumina | 20.8 | 600 |

Each of catalysts of Embodiments 1 to 11 exhibits the same or more increased conversion activity for NO than Pt/gamma-alumina catalysts as Comparative Example 1, while the reaction temperature is the same or lower compared therewith. Therefore, as Table 1 proves, the conversion of NO can be converted with a more enhanced activity.

As shown by FIG. 1, which shows XRD pattern of catalysts of Embodiments 1 and 4, and Comparative 1. In the case of each catalyst, both the diffraction patterns of not only the crystal structure of the support material but also the platinum crystal supported thereon are found. Although the X-ray diffraction peaks of Pt are found in all examples, the peak exhibited by Pt supported on the phosphate-containing compound oxide is weaker than the peak by Pt on gamma-alumina support. Such weakened peaks rather prove that Pt of the present embodiments is supported on the support material in the state of highly dispersed condition. As discussed above, since the active metal can be present in the highly dispersed condition on the surface of the phosphate-containing compound oxide support material, a higher catalytic activity can be realized even at lowered temperatures.

[2] Next, the Embodiments 21 to 30 relate to exhaust gas treatment catalysts having boron-added phosphate-containing compound oxide as the support material and platinum which is supported on the surface of the support material, and also relate to a method of platinum catalysts.

Embodiment 21

An aqueous solution of aluminum nitrate and phosphoric acid was prepared so that the ratio of aluminum relative to phosphorus is 1:1, and, into the solution, aqueous ammonia was added in the rate of 0.4 ml/min with stirring. The aqueous ammonia was further reduced with measurement of the pH value of the solution, and addition of the solution was terminated when the pH value reached 7.0. The resulting solution containing a co-precipitate of aluminum and phosphorus was allowed to be kept quiet for 17 hours at room temperature, and then filtered by aspiration to produce a gel-formed co-precipitate.

The gel-formed co-precipitate was washed with 400 ml of purified water, then dried at 110° C. for 40 hours and milled using a mortar to produce fine powder. The powder was calcined at 400° C. for 3 hours to synthesize aluminum-phosphorus compound oxide support.

The prepared oxide support was immersed in mixed aqueous solution of:

(1) tetrammine platinum nitrate, whose concentration was adjusted so as to contain 2 wt % of platinum relative to the support material, and (2) boric acid, whose concentration was adjusted so as to contain 5 wt % of boron relative to the support material. After the water was evaporated, the residue was dried and calcined at 600° C. for 5 hours to synthesize a platinum catalyst supported on boron-added aluminum-phosphorus compound oxide.

Embodiment 22

A platinum catalyst supported on boron-added gallium-phosphorus compound oxide was prepared, in exactly the same process as in Embodiment 21, but replacing aluminum nitrate with gallium nitrate.

Embodiment 23

A platinum catalyst supported on boron-added lanthanum-phosphorus compound oxide was prepared, in exactly the same process as in Embodiment 21, but replacing aluminum nitrate with lanthanum nitrate.

Embodiment 24

A platinum catalyst supported on boron-added cerium-phosphorus compound oxide was prepared, in exactly the same process as in Embodiment 21, but replacing aluminum nitrate with cerium nitrate.

Embodiment 25

A platinum catalyst supported on boron-added yttrium-phosphorus compound oxide was prepared, in exactly the same process as in Embodiment 21, but replacing aluminum nitrate with yttrium nitrate.

Embodiment 26

A platinum catalyst supported on boron-added magnesium-phosphorus compound oxide was prepared, in exactly the same process as in Embodiment 21, but replacing aluminum nitrate with magnesium nitrate.

Embodiment 27

A platinum catalyst supported on boron-added calcium-phosphorus compound oxide was prepared, in exactly the same process as in Embodiment 21, but replacing aluminum nitrate with calcium nitrate.

Embodiment 28

A platinum catalyst supported on boron-added manganese-phosphorus compound oxide was prepared, in exactly the same process as in Embodiment 21, but replacing aluminum nitrate with manganese nitrate.

Embodiment 29

A platinum catalyst supported on boron-added cobalt-phosphorus compound oxide was prepared, in exactly the same process as in Embodiment 21, but replacing aluminum nitrate with cobalt nitrate.

Embodiment 30

A platinum catalyst supported on boron-added nickel-phosphorus compound oxide was prepared, in exactly the same process as in Embodiment 21, but replacing aluminum nitrate with nickel nitrate.

Comparative Example 2

A platinum catalyst in the structure including an active metal supported on gamma-alumina support was prepared in the conventional method in the process: the gamma-alumina was immersed in aqueous solution of tetrammine platinum nitrate, whose concentration was adjusted so as to contain 2 wt % of platinum relative to the support material, and then distilled and dried. The produced powder was calcined at 600° C. for 5 hours to synthesize a platinum catalyst supported on gamma-alumina support material.

The synthesized platinum catalysts supported on boron-added phosphate-containing compound oxide supports were tested for their performance in the same method as performed in the catalysts of group [1].

In each product of catalysts, maximum conversion activity for $C_3H_6$ and CO was as high as 99% or more. In Table 2 were listed the maximum conversion rates and reaction temperatures each providing maximum conversion activity.

TABLE 2

| Name | Catalyst | Maximum Conversion % for NO | Maximum Activity Temperature °K. |
|---|---|---|---|
| Embodiment 21 | Pt.B/AlPO$_x$ | 32.2 | 580 |
| Embodiment 22 | Pt.B/GaPO$_x$ | 32.0 | 580 |
| Embodiment 23 | Pt.B/LaPO$_x$ | 31.8 | 562 |
| Embodiment 24 | Pt.B/CePO$_x$ | 31.5 | 538 |
| Embodiment 25 | Pt.B/YPO$_x$ | 33.9 | 538 |
| Embodiment 26 | Pt.B/MgPO$_x$ | 29.1 | 577 |
| Embodiment 27 | Pt.B/CaPO$_x$ | 25.3 | 567 |
| Embodiment 28 | Pt.B/MnPO$_x$ | 21.6 | 580 |
| Embodiment 29 | Pt.B/CoPO$_x$ | 23.5 | 570 |
| Embodiment 30 | Pt.B/NiPO$_x$ | 22.9 | 582 |
| Comparative Example 2 | Pt.B/gamma-alumina | 22.1 | 590 |

As can be seen above, any of catalysts as embodiments 21 to 30 exhibits a same or further improved NO conversion activity compared with Pt.B/gamma-alumina as Comparative Example 2, while the reaction temperature is the same or less than that of such Comparative Example 2, and therefore it is proved that higher NO conversion activity is achieved at lowered temperatures by each of embodying catalysts. Also, it is found that the addition of boron is effective to extensively increase NO conversion activity, and the maximum activity temperature is also shifted to the lower temperature in almost every case, as can be seen in Embodiments 21 to 30, when compared with the result of Embodiments 1 to 11. On the contrary, the effect of addition of boron was extremely insufficient in the case of Pt.B/gamma-alumina as proved by Comparative Example 2.

Figure 2:
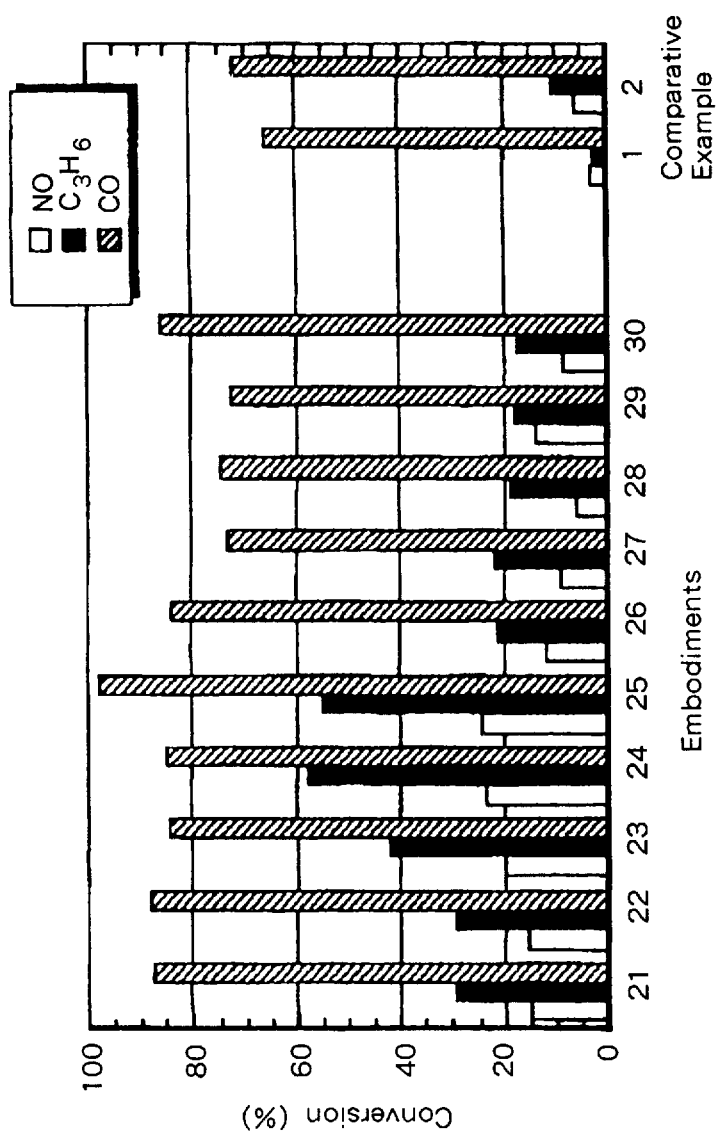
FIG. 2 is a diagram illustrating conversion activity of catalysts of Embodiments 21 to 30 and Comparative Examples 1 and 2 for $C_3H_6$, CO and NO in the comparatively low temperature range.

FIG. 2 shows the conversion activity for $C_3H_6$, CO and NO at a comparatively lowered temperature of 523K, in order to examine the catalytic activity in the low temperature range which was discussed as one of problems in the conventional catalysts. As can be seen, each of catalysts of Embodiment 21 to 30 exhibits the higher conversion activity for $C_3H_6$, CO and NO compared with Pt.B/gamma-alumina as Comparative Example 2. Accordingly, the result proves the catalysts of Embodiments 27, 29 and 30 exhibit the higher and increased conversion activity not only for NO but also for hydrocarbons such as $C_3H_6$ as well as for CO compared with any of conventional gamma-alumina catalysts.

Figure 3:
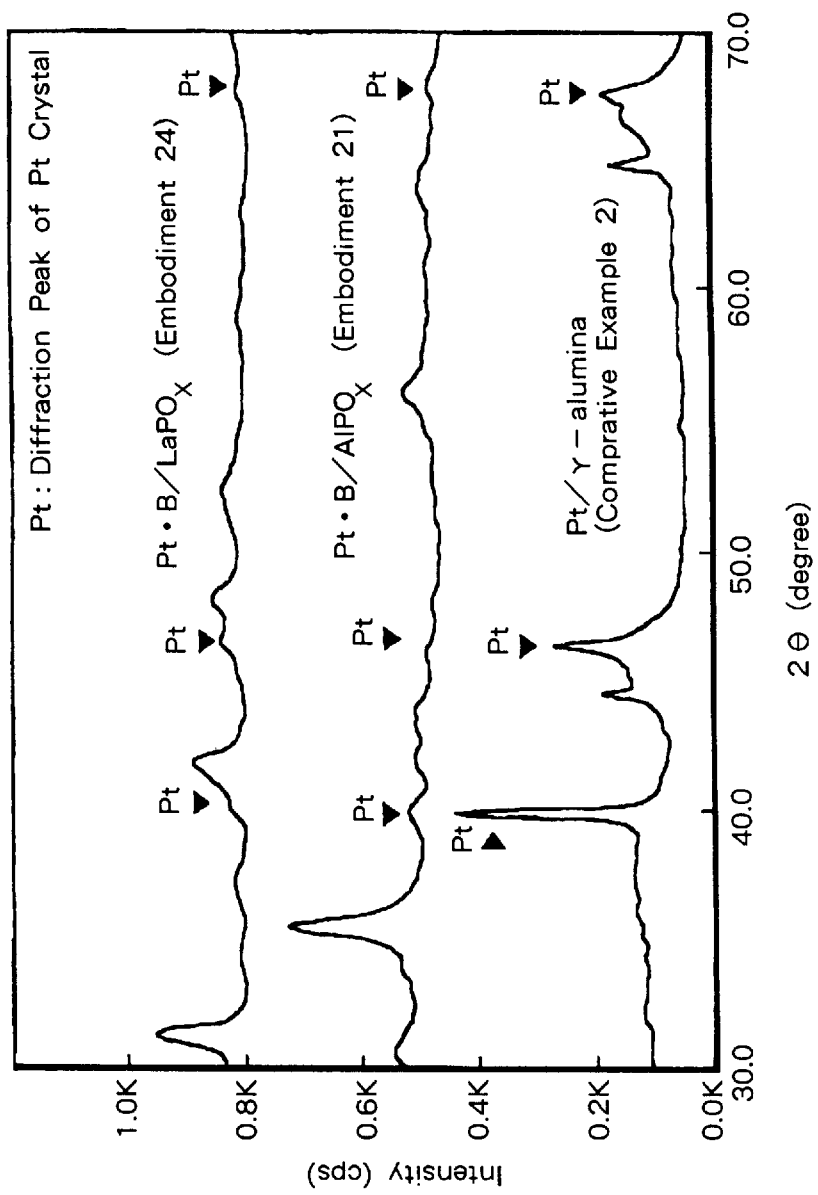
FIG. 3 shows again XRD patterns of Embodiments 21 and 24, as well as Comparative Example 2.

FIG. 3 shows the result of XRD measurement on Examples 21 and 24, as well as Comparative Embodiment 2. In each catalyst, in addition to the pattern representing the crystal structure of the support material, the diffraction pattern of platinum (Pt) dispersed on the surface of the support material is recognized.

As found by comparing with FIG. 1, the X-ray diffraction peaks of Pt supported on the support of the phosphate-containing compound oxide are weakened: this rather shows the fact that the degree of dispersion of Pt has been largely increased. In contrast thereto, also the effect of boron addition is not so remarkable in the case of Pt supported on the gamma-alumina.

From the result above, it is found the support material which is combined with boron produces a associative effect for increasing the dispersion of Pt on the surface of the support of phosphate-containing compound oxide. As a result, the higher maximum NO conversion activity is obtained.

FIG. 4 shows the result of $C_3H_6$ TPD ("Temperture-programmed description") measurement of the catalysts including Embodiment 25, which is one of catalysts exhibiting the highest catalytic activity, together with Comparative Example 1.

The experiment of "TPD" was performed in the process: the catalyst was pre-treated at 537K in 10% $C_3H_6$ gas and allowed to sufficiently absorb $C_3H_6$; cooled to room temperature with maintaining the 10% $C_3H_6$ gas flow. Then the catalyst was heated by the rate of 5° C./min in nitrogen gas, and the freed $C_3H_6$ gas was detected by means of mass spectrograph, wherein the vertical coordinate is represented by an arbitrary unit (a.u.).

As discussed above, the result shows the catalysts of the invention can prevent strong hydrocarbon adsorption even at low temperatures. As well known, one of the principal causes for decreasing the catalytic activity at the low temperature is the retarded reaction by strong adsorption of the reactant itself onto the catalyst surface. As found by the result of FIG. 4 such a strong adsorption is effectively decreased by the compound effect obtained by the combination of the support and boron added thereto, and therefore the improved catalytic activity at the low temperature is achieved.

In addition, as found by the result of FIG. 4, the addition of boron to the support material is effective for increasing the dispersion of the active metal, modifying the chemical properties, and suspending the strong adsorption of hydrocarbons.

What is claimed is:

1. A catalyst for exhaust gas treatment comprising:
   a support material, said support material consisting essentially of boron, a phosphate-containing oxide compound and an element, said element selected from the group consisting of elements of Group IIa, Group IIIb, manganese, cobalt, nickel, cerium, and gallium; and
   an active metal supported on the surface of said support material.

2. The catalyst according to claim 1, wherein said active metal comprises platinum.

3. A method of preparing a catalyst for exhaust gas treatment, said catalyst comprising a support material and an active metal supported thereon, said support material consisting essentially of boron, an element and phosphorus, said element selected from the group consisting of elements of Group IIa, Group IIIb, manganese, cobalt, nickel, cerium, and gallium; said method comprising the steps of co-precipitating said support material from a solution containing a phosphate-containing oxide compound and a salt of elements selected from the group consisting of elements of Group IIa, Group IIIb, manganese, cobalt, nickel, cerium, and gallium; and adding boric acid to the solution wherein boron molecules are incorporated into the support structure.

4. A method of preparing a catalyst for exhaust gas treatment, said catalyst comprising a support material and an active metal supported thereon, said support material consisting essentially of boron, an element and phosphorus, said element selected from the group consisting of elements of Group IIa, Group IIIb, manganese, cobalt, nickel, cerium, and gallium; said method comprising the steps of:
   immersing said support material in a solution containing a precursor of said active metal; and
   dispersing said active metal on said support by adding boric acid to said solution.

* * * * *

UNITED STATES PATENT AND TRADEMARK OFFICE
CERTIFICATE OF CORRECTION

PATENT NO. : 5,880,057
DATED : March 9, 1999
INVENTOR(S) : Masaharu Hatano

It is certified that error appears in the above-identified patent and that said Letters Patent is hereby corrected as shown below:

Column 2, line 7, delete "than have" and insert --than--.
Column 2, line 11, delete "removal of for" and insert --removal of--.
Column 4, line 30, before last line of Table 1, insert line.
Column 6, line 45, before last line of Table 2, insert line.
Column 7, line 23, delete "Examples" and insert --Embodiments--.
Column 7, line 23, delete "Embodiment" and insert --Example--.
Column 7, line 42, delete "description" and insert --Desorption--.
Column 8, line 34, delete "steps of" and insert --steps of:--.

Signed and Sealed this

Nineteenth Day of October, 1999

Attest:

Q. TODD DICKINSON

*Attesting Officer*     *Acting Commissioner of Patents and Trademarks*